United States Patent [19]

Okuyama et al.

[11] 4,240,020
[45] Dec. 16, 1980

[54] CONTROL SYSTEM FOR SUPPRESSING TORQUE RIPPLE IN SYNCHRONOUS MOTOR

[75] Inventors: Toshiaki Okuyama; Yuzuru Kubota; Hiroshi Nagase, all of Hitachi; Katsunori Suzuki, Takahagi, all of Japan

[73] Assignee: Hitachi, Ltd., Japan

[21] Appl. No.: 920,699

[22] Filed: Jun. 30, 1978

[30] Foreign Application Priority Data

Jul. 4, 1977 [JP] Japan .................................. 52/79133

[51] Int. Cl.³ ............................................. H02P 7/28
[52] U.S. Cl. .................................. 318/721; 318/722; 318/800
[58] Field of Search ........ 318/700, 721, 722, 799–803, 318/809

[56] References Cited

U.S. PATENT DOCUMENTS

| | | | |
|---|---|---|---|
| 3,824,437 | 7/1974 | Blaschke | 318/803 |
| 3,919,609 | 11/1975 | Klautschek et al. | 318/803 |
| 4,023,083 | 5/1977 | Plunkett | 318/802 |
| 4,060,753 | 11/1977 | Okuyama et al. | 318/700 |
| 4,088,935 | 5/1978 | D'atre et al. | 318/802 |
| 4,125,796 | 11/1978 | Nagase et al. | 318/721 |

Primary Examiner—Gene Z. Rubinson
Attorney, Agent, or Firm—Craig & Antonelli

[57] ABSTRACT

A synchronous motor having multi-phase armature windings and a field winding is driven by a frequency converter. Actual torque is determined from a sinusoidal position signal representative of rotational position of the synchronous motor and the armature current. The actual torque value is compared with a command torque signal, whereby the armature current is controlled in dependence on difference or deviation resulting from the comparison thereby to cancel the torque ripple. Torque ripple can thus be suppressed to a satisfactory degree even at a low rotation speed of the synchronous motor.

6 Claims, 13 Drawing Figures

CONTROL SYSTEM FOR SUPPRESSING TORQUE RIPPLE IN SYNCHRONOUS MOTOR

BACKGROUND OF THE INVENTION

1. Field of the Invention

The present invention relates to a control system for a synchronous motor adapted to be driven by a frequency converter. Particularly, the invention concerns a control system for suppressing a pulsation in torque or a torque ripple produced in a synchronous motor driven at a low rotation speed thereof.

2. Description of the Prior Art

The synchronous motor adapted to be driven by a thyristor converter is well known in the art as referred to as a commutatorless motor which is a variety of a variable speed motor having no commutator and allows advantageously a very wide speed control range as well as a facilitated maintenance due to the commutatorless structure.

In general, the commutatorless motor is classified into two types, i.e. current type commutatorless motor and voltage type commutatorless motor. The current type motor is adapted to be driven by a square current. The torque produced in this type commutatorless motor is likely to contain pulsating or ripple component. On the other hand, in the case of the voltage type commutatorless motor, no pulsating or ripple component will be theoretically present. However, when unbalance occurs among the armature currents of different phases or when the current waveform undergoes distortions, the ripple component will be present in the torque as produced. Among the causes for involving such waveform distortion, there may be enumerated, for example, amplitude limitation of the armature current performed with a view to enhancing the utility efficiency of the thyristor elements constituting the driver or converter circuit, as discussed in U.S. Pat. No. 3,942,091. It will be readily appreciated that such ripple components in the produced torque will result in fluctuation of the motor speed particularly at a low revolution frequency and exert adverse influence onto a load powered from the motor. Further, occurrence of resonance in the mechanical system including the rotating shaft will sometimes incur application of an excessive torque on the motor output shaft.

With an attempt to eliminate the disadvantages described above, U.S. Pat. No. 3,919,609 teaches a method and circuit for reducing the torque ripple in which a torque produced is arithmetically determined on the basis of a product of the motor voltage and current and utilized as an actually detected torquue value which is then compared with a command or reference torque value. The motor current is controlled in dependence on the difference or deviation obtained from the comparison in the sense to reduce the torque ripple. However, this prior art control can not evade a drawback ascribable to the fact that the torque as produced is arithmetically determined from the product of the armature voltage and current. More specifically, the armature voltage (i.e. induced voltage) will be at a low level in a range of low revolution frequencies in which the torque ripple comes to the front. On the other hand, there are voltage components which play no part in the production of torque, e.g. voltage component induced by the ripple contained in the rectified output voltage of the frequency converter and the resistive voltage drop produced in the motor winding. Although these voltage components are subjected to substantially no variation as a function of the motor rotation speed, they will occupy a relatively large portion of the motor voltage at the low rotation speed. Consequently, the accuracy at which the torque difference or deviation is detected will be necessarily degraded in the low speed operation of the motor to such a degree that satisfactory suppression of the torque ripple can not be effected. Further, because the actual torque value will become pulsated due to the voltage component induced by the ripple component contained in the rectified output from the converter circuit, the motor current will undergo a corresponding pulsation, which results in an increased torque ripple. In this manner, it is impossible to suppress the torque ripple at a low rotation speed of the motor with a desired accuracy in accordance with the teachings disclosed in U.S. Pat. No. 3,919,609.

SUMMARY OF THE INVENTION

Therefore, an object of the invention is to provide a control system for a commutatorless synchronous motor which is capable of suppressing the torque ripple or pulsation with a satisfactory accuracy even at a low speed rotation of the motor.

According to an aspect of the invention, magnitude of a main magnetic flux (or motor voltage) is determined from a rotational position signal of the synchronous motor, and the torque as produced is arithmetically determined from the magnitude of the main magnetic flux and the motor current to be compared with a command or reference torque value, whereby the motor current is controlled in dependence on difference or deviation of the actual torque value from the command torque value.

The above and other objects, features and advantages of the invention will become more apparent from the description on the preferred embodiments of the invention. The description makes reference to the accompanying drawings.

DETAILED DESCRIPTION OF THE PREFERRED EMBODIMENTS

Figure 1:
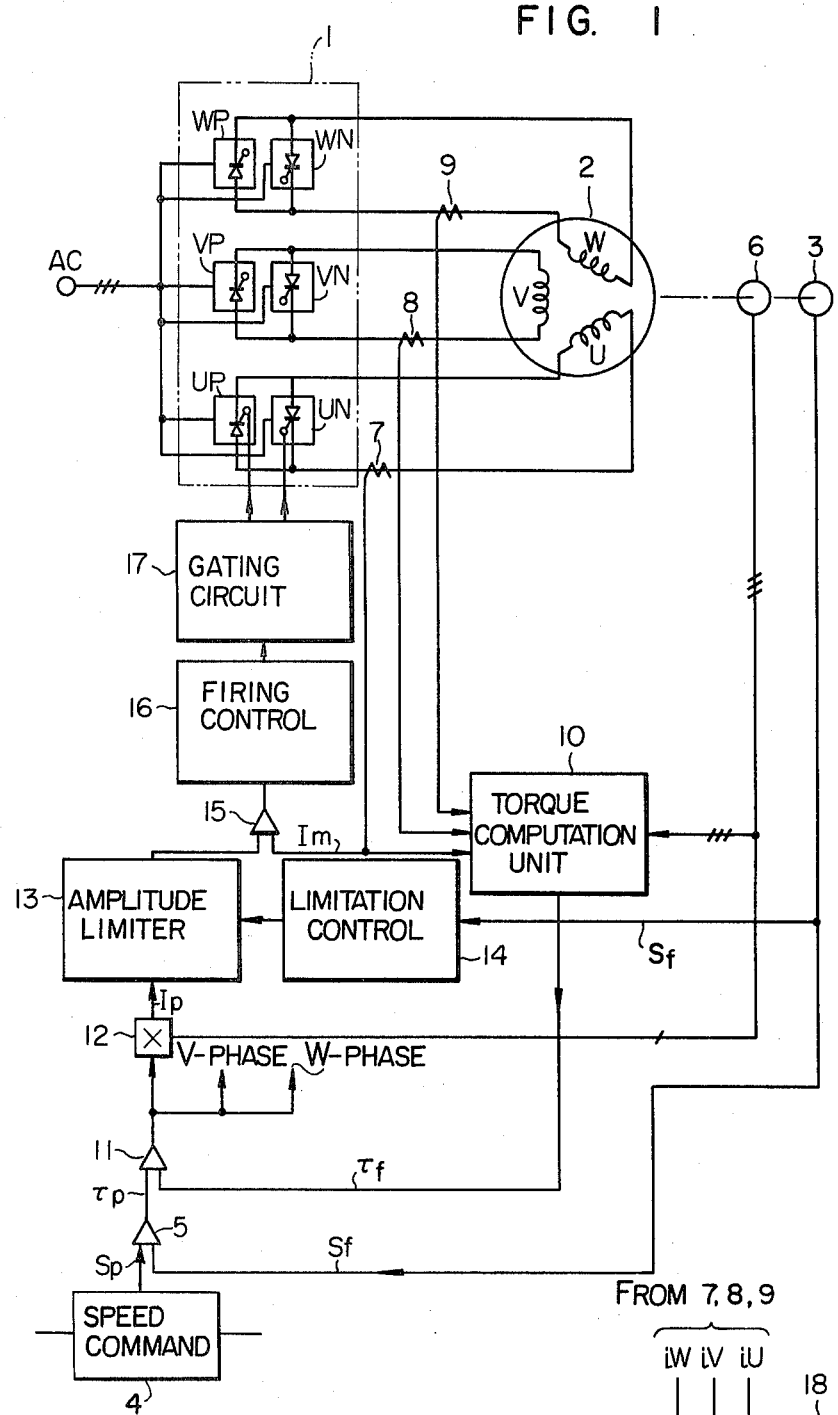
FIG. 1 is a schematic circuit diagram showing a general arrangement of a control system for a synchronous motor according to an embodiment of the invention.

Referring to FIG. 1 which is a schematic circuit diagram showing a general arrangement of the control system for a synchronous motor according to an embodiment of the invention in which a cyclo converter having a sinusoidal wave current output is employed as a frequency converter in combination with an amplitude limiter circuit, reference numeral 1 denotes a cyclo converter having input coupled to an AC power source such as a commercial AC line and three phase alternating current (AC) output of a variable frequency. The cyclo converter 1 is constituted by three pairs of thyristors UP; UN, VP; VN and WP; WN of anti-parallel connection wired in the Graetz connection. The cyclo converter 1 serves to drive a synchromotor 2 having three phase armature windings U, V and W as well as a field system and compensation winding system (not shown). A tachometer generator 3 is provided at the output shaft of the synchronous motor 2 for detecting the rotation speed thereof. A speed command circuit 4 produces a speed command signal Sp which is applied to an input of a speed signal differential amplifier 5 having other input for receiving a speed feedback signal $S_f$ which is the output signal from the tachometer generator 3, thereby to produce a torque command signal τp. A rotational position detector 6 is provided for producing three phase sinusoidal waveform signals having phase difference of 120° relative to one another (hereinafter referred to as the position signals) in dependence on the relative position (rotational angle) between the field system and the armature. Such position detector 6 may be composed of permanent magnets mounted on a rotor at an appropriate position thereof and three Hall generators disposed or a stator as angularly spaced from one another by 120° in correspondence to the three phase armature windings U, V and W and positioned so as to be passed by the permanent magnet upon rotation of the rotor. Reference numerals 7, 8 and 9 denote current detectors for detecting the individual phase current outputs from the cyclo converter 1, the output signals of which detectors are supplied to a torque computation arithmetic unit 10 having the other input applied with the position signal from the position detector 6 for arithmetically determining the torque produced in the synchronous motor 2 and producing a corresponding output signal $\tau_f$ (hereinafter referred to as the torque feedback signal) in accordance with arithmetic operations described hereinafter. The torque command signal $\tau_p$ from the speed signal differential amplifier 5 is applied to a torque signal differential amplifier 11 together with the torque feedback signal $\tau_f$ from the arithmetic unit 10. The output signal from the differential amplifier 11 is applied to an amplitude limiter 13 together with the U-phase position signal supplied from the position detector 6 thereby to produce a product signal which constitutes a current command signal of a sinusoidal waveform for controlling the U-phase output current from the cyclo converter 1 after having been limited in respect of the amplitude value $I_L$ through an amplitude limiter circuit in dependence on the rotation speed of the synchronous motor. To this end, a limitation command signal circuit 14 is provided for producing a limitation command signal which is applied to the amplitude limiter circuit 13 to control the limit level thereof. The output signal from the amplitude limiter circuit 13 is applied to a current differential amplifier 15 together with the signal from the current detector 7. A firing control circuit 16 responds to the output signal from the differential amplifier 15 thereby to control correspondingly the firing phase angle of the thyristors UP and UN for the U-phase output current of the cyclo converter 1. To this end, there is provided a gate circuit 17 which functions to supply a gate signal to the thyristor UP and UN alternatively in dependence on the direction of the U-phase output current. Although only the control channel including the circuit components 12 to 17 for the thyristor circuit UP; UN, it will be self-explanatory that the identical control channels are provided for the thyristor circuits VP; VN and WP; WN, respectively, as schematically represented by arrows labelled as "V-phase" and "W-phase".

Figure 2:
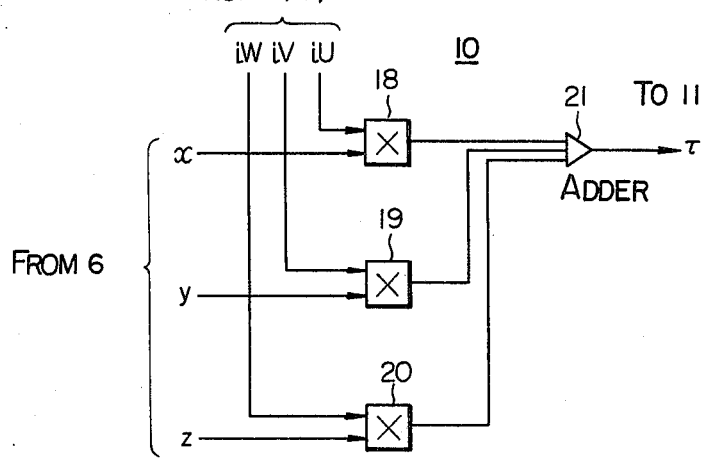
FIG. 2 is a circuit diagram showing an arithmetic operation unit employed in the control system shown in FIG. 1.

FIG. 2 shows a circuit diagram of the arithmetic operation unit 10 for determining the torque. In the figure, symbols x, y and z denote the position signals produced by the position detector 6, while $i_U$, $i_V$ and $i_W$ denotes the output signals from the current detectors 7, 8 and 9, respectively. Multipliers 18, 19 and 20 serve, respectively, to produce product signals from $i_U$ and x, $i_V$ and y, and $i_W$ and z, which product signals are then applied to an adder.

Next, operation of the arithmetic unit 10 will be described. As hereinbefore described, the position detector 6 is composed of a rotor provided with permanent magnets and coupled to the rotating shaft of the synchronous motor 2 and a stator provided with the Hall generators for detecting the magnetic fields of the permanent magnets thereby to produce corresponding output signals. The permanent magnets are provided in number equal to the pole number of the synchronous motor 2 and arrayed on the rotor so as to form alternatively N- and S-poles. The Hall generators are mounted on the stator as spaced from one another by 120° in electrical angle. Thus, the position detector 6 will produce the three phase sinusoidal waveform position signals x, y and z each having a phase corresponding to the rotation angle of the rotor and a constant amplitude. The position signals x, y and z may be mathematically expressed as follows:

$$x = \sin \omega t$$
$$y = \sin (\omega t - (2/3)\pi)$$
$$z = \sin (\omega t - (4/3)\pi) \tag{1}$$

Since the amplitude of these signals are always at a constant value, the symbol representing the constant amplitude is omitted from the expressions.

The position signals x, y and z given by the above expression (1) are so set as to be synchronous with induction of the nominal electromotive forces or EMF' in the individual phase windings of the synchronous motor 2, respectively. On the other hand, the terminal voltage of the armature winding as compensated in respect of the armature reaction through the compensation winding will coincide always with the nominal induced EMF (i.e. terminal voltage under no-load) in respect of the amplitude and phase, even if variation occurs in the load condition. Accordingly, the torque determined arithmetically on the basis of the below mentioned expression (2) will represent the instantaneous torque value:

$$\tau = x \cdot i_U + y \cdot i_V + z \cdot i_W \tag{2}$$

The torque can be determined from the product of the terminal voltage and the armature current. Since the position signals x, y and z are in phase with the terminal voltages as described above, the products of the position signals and the instantaneous armature phase current will proportionally correspond to the instantaneous torque which thus can be given by the above expression (2). Because the amplitude of the position signals x, y and z remains constant regardless of change in the motor speed, the signal $\tau$ reflects with fidelity the instantaneous torque produced in the motor and thus can be utilized as the actual instantaneous torque signal containing possibly the ripple component thereof.

Figure 3:
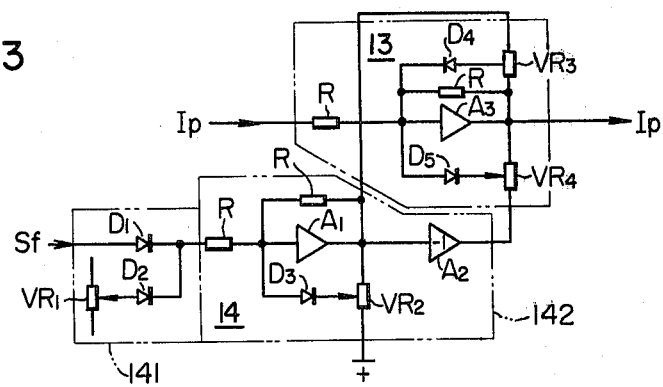
FIG. 3 is a circuit diagram showing an amplitude limiter circuit employed in the control system shown in FIG. 1.

In FIG. 3, circuit arrangements of the amplitude limiter circuit 13 and the limitation command circuit 14 are shown in some detail. In the figure, symbol $I_p$ represents the output signal (current command signal) of the multiplier 12, while $S_f$ represents the output signal from the tachometer generator 3. A dotted line block 141 represents a lower limit setting circuit for setting the lower limit of the limitation value. The circuit 141 is composed of a variable resistor $VR_1$ and diodes $D_1$ and $D_2$ and operates to produce the lower limit value $I_{LL}$ when the tachometer signal $S_f$ is smaller than the value set by the variable resistor $VR_1$. On the other hand, an upper limit setting circuit 142 is provided for setting an upper limitation value $I_{LU}$ which is applied as the upper limit command to the amplitude limiter circuit 13. This circuit 142 is composed of a setting potentiometer $VR_2$, diode $D_3$, amplifier $A_1$, inverter amplifier $A_2$ and a resistor R and operates to produce an output signal proportional to the output signal from the lower limit setting circuit 141, so far as the latter remains lower than a predetermined value, while producing a signal of a constant value as set by the variable resistor $VR_2$ when the output from the circuit 141 exceeds by the predetermined value. The amplitude limiter circuit 13 is composed of variable resistors $VR_3$ and $VR_4$, diodes $D_4$ and $D_5$, an amplifier $A_3$ and resistors $R_3$; $R_4$ and operates to pass therethrough the current command signal IP from the multiplier 12 when the signal $I_P$ is lower than a predetermined value, while producing a constant value signal $I_L$ set by the variable resistors $VR_3$ and $VR_4$ when the input signal $I_P$ is greater than a predetermined value.

The signal $I_P$ is input to the differential amplifier 15 to be compared with the output signal from the current detector 7, whereby the firing phases of the thyristors UP and UN are controlled in dependence on the difference resulting from the comparison, as illustrated in FIG. 1. Consequently, U-phase armature current is controlled in proportional dependence on the signal $I_P$.

Figure 4A:
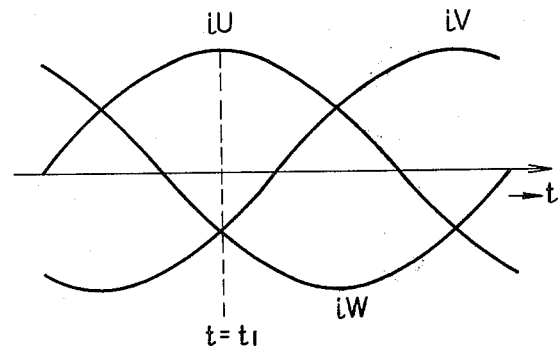
FIGS. 4a to 4c are signal waveform diagram to illustrate the operations of the amplitude limiter circuit.
Figure 4B:
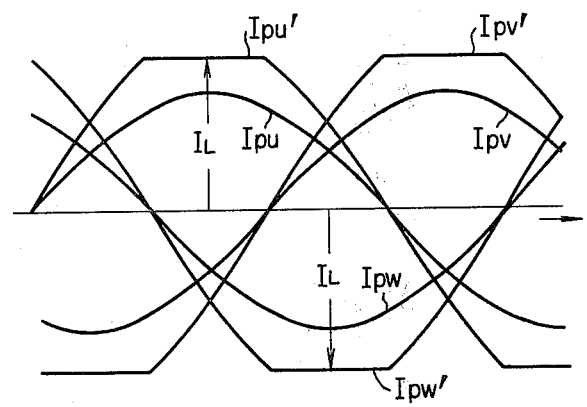
Figure 4C:
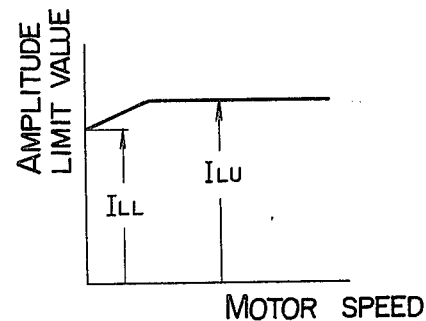

Description will be here made on the reason why the amplitude of the current command signal $I_P$ is limited as described above, by referring to FIGS. 4a to 4c. FIG. 4a shows variation of the armature current as a function of time. At a relatively high frequency, the individual thyristors UP to WN will become sequentially conductive. However, when the frequency is low and in particular equal to zero, the state in which U-phase current has attained the maximum value at $t_1$, for example, will continue to prevail for a long duration. Under such circumstance, a large current will flow through only the thyristor UP which will be then overheated. This phenomenon is often referred to as concentration of current in a specific thyristor (hereinafter referred to simply as current concentration). The increased current in a thyristor due to the current concentration will sometimes amount to about three times as high as the current flow in the normal state. Such current concentration has of course to be prevented. To this end, the amplitude limiter circuit 13 described above is used. FIG. 4b is a signal waveform diagram showing the output of the amplitude limiter circuit 13, in which $I_{PU}$, $I_{PV}$ and $I_{PW}$ represent the output signal waveforms produced in response to the current command signal $I_P$ of a small amplitude, while $I_{PU}'$, $I_{PV}'$ and $I_{PW}'$ represent the output signals produced when the current command signal $I_P$ is of a large amplitude. When the armature current is of a great magnitude, the output signal from the amplitude limiter circuit 13 will take a trapezoidal profile. In this manner, the maximum current value is limited or clamped, whereby the current concentration can be suppressed. Since the current concentration becomes more intensive as the frequency is lower and vice versa, it is preferred in practice to change the limit value in dependence on the motor speed.

Referring again to FIG. 1, operation of the whole control system will be described. When the synchronous motor 2 is running at a low speed, the current command signal $I_P$ will undergo amplitude limitation by the amplitude limit circuit 13 to be converted into a trapezoidal waveform $I_{PU}'$ shown in FIG. 4b, which is then compared with the output signal $I_m$ from the current detector 7 through the differential amplifier 15. The difference or deviation signal output from the amplifier 15 is applied to the firing control circuit 16 which will then produce gate signals through the gate output circuit 17 for controlling the firing phase angles of the thyristors UP and UN in dependence on the difference or deviation signal. In this connection, it should be noted that the gate output circuit 17 functions to determine which of the thyristors UP or UN is to be applied with the gate signal during a particular phase in dependence on the polarity of the armature current and the magnitude of the motor voltage. As the result, the armature current of U-phase is controlled to be of a trapezoidal waveform thereby to reduce the current concentration. However, because the armature current will contain harmonic component at that time, ripple or pulsation will occur in the produced torque. Such torque ripple or pulsation is prevented in the manner mentioned below.

The torque pulsation or ripple will necessarily involve corresponding ripple component in the torque feedback signal $\tau_f$ applied to the arithmetic unit 10, because the instantaneous torque is detected in accordance with the expression (2) described hereinbefore. The control channel including the torque differential amplifier to the cyclo converter has a sufficient response performance to respond to the ripple component contained in the torque feedback signal $\tau_f$ thereby to vary correspondingly the current flowing through the control channel. Thus, the current is controlled so that the torque detection signal may follow up the torque command signal, whereby the torque is maintained constant with the torque ripple or pulsation is eliminated. More specifically, when the amplitude of one phase current is limited, currents of other two phases will be correspondingly increased, as the result of which decreasing in the produced torque due to the amplitude limitation of the one phase current can be prevented.

When the motor is driven at a high rotation speed, the limit value $I_{LU}$ of the amplitude limiter circuit 13 is increased, so that the peak value of the current command signal can not attain the limit value $I_{LU}$. Consequently, the current command signal $I_P$ is input to the differential amplifier 15. The armature current will be thus of a sinusoidal waveform. When the armature current is of such sinusoidal waveform, no torque ripple will be preduced in principle. However, unbalance among the phase current will produce torque ripple or pulsation which is also prevented through the current control described above.

As will be appreciated from the foregoing description, the actual torque value to be utilized for the suppression of the torque ripple is determined from the position signal and the armature current. Since the position signal as produced in the manner described hereinbefore has a constant amplitude and contains few voltage component which is irrelevant to the produced torque such as voltage component induced by the rectification ripple, the accuracy of torque detection is enhanced regardless of whether the motor is driven at a low speed or high speed. Further, actual torque will not become pulsated due to the rectification ripple. In this manner, the torque ripple or pulsation can be suppressed effectively according to the teachings of the invention.

In the case of the control system described above, it has been assumed that the field current is constant.

Figure 5:
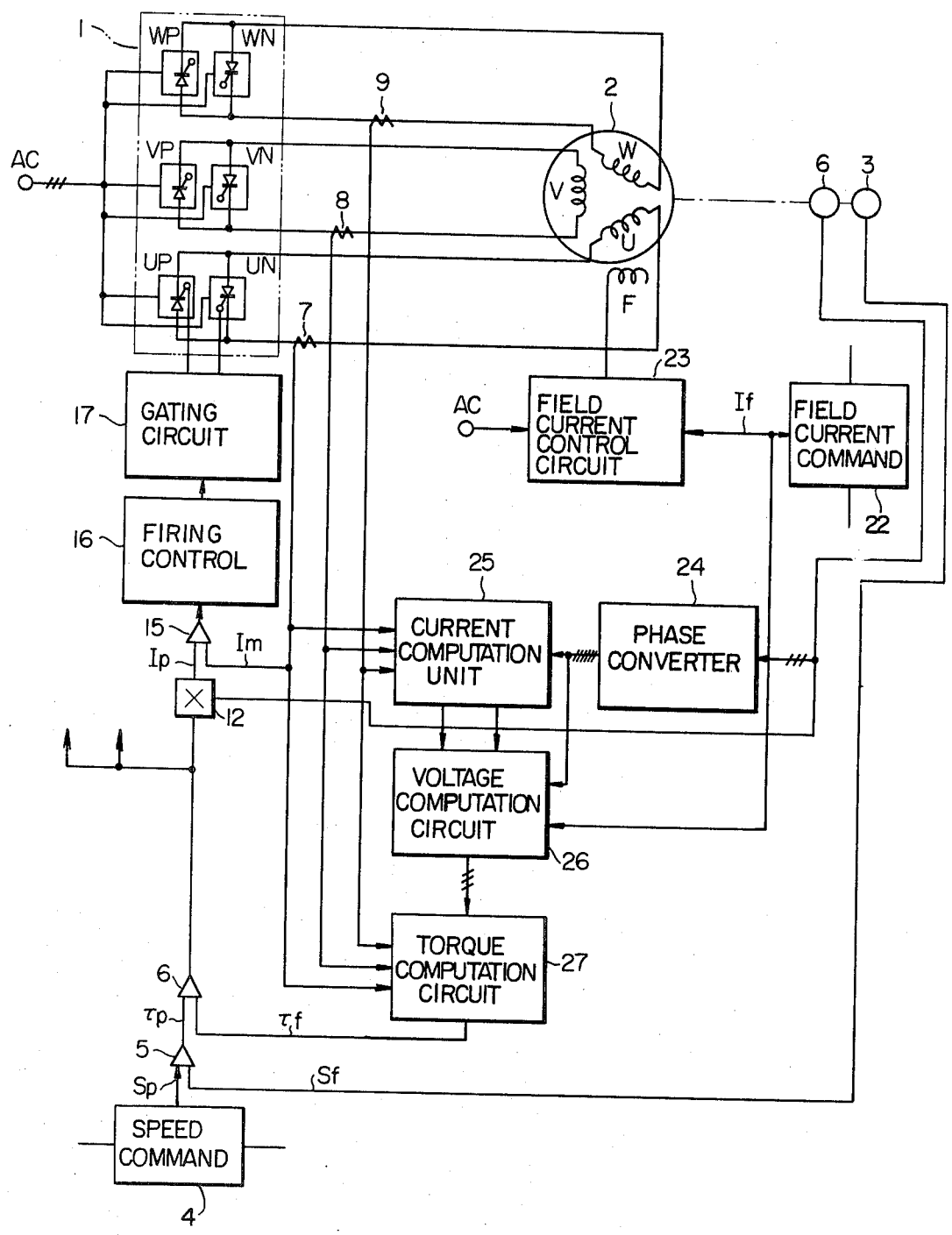
FIG. 5 is a schematic circuit diagram showing a general arrangement of a control system for a synchronous motor according to another embodiment of the invention.

FIG. 5 shows another embodiment of the control system according to the invention in which the field current is to be controlled. In this figure, those circuit components which correspond those shown in FIG. 1 are denoted by the same reference numerals.

Now, referring to FIG. 5, reference latter F denotes a field winding of the synchronous motor 2, the excitation of which is under control of a field current control circuit 23 having an input applied with a field current command signal $I_f$ from a field current command circuit 22 and another input from a commercial frequency power line AC thereby to supplie field current to the field system F in dependence on the field current command signal. Reference numeral 24 denotes a phase converter for producing six position signals from the three-phase position signal output from the position detector 6. The output of the phase converter 24 is coupled to a current computation unit 25 for determining arithmetically the three-phase armature current in terms of vector. Namely 26 denotes a voltage computation circuit for determining arithmetically the terminal voltage (fundamental wave component) of the synchronous motor 2 from the field command signal $I_f$, the position signals from the phase converter 24 and the output signal from the current computation circuit 25, and 27 denotes a torque computation circuit for arithmetically determining the instantaneous torque of the synchronous motor 2 on the basis of the output signals from the current detectors 7, 8 and 9 and the output signal from the voltage computation unit 26.

The operation of the control system described above is substantially identical with the operation of the system shown in FIG. 1 except for the operation for determining the actual torque value. According to the teachings of the invention incarnated in the embodiment shown in FIG. 5, the terminal voltage or fundamental voltage component of the synchronous motor operating at a rated speed is determined and multiplied by the armature current of the corresponding phase thereby to produce a product signal from which the actual torque value is determined. Obviously, the terminal voltage determined from the position signals may be the one which is obtained at a preset speed of the synchronous motor rather than the actual rated speed. This can be explained as follows. The torque can be determined by dividing the product of the terminal voltage (main magnetic flux) and the armature current by the motor speed, which will be in proportion to the terminal voltage on the assumption that the field excitation current is constant. Thus, it is possible to derive the torque at a given motor speed from the product of the terminal voltage and the armature current. Of course, it is preferred in practice that the preset speed coincides with the rated speed.

Figure 6:
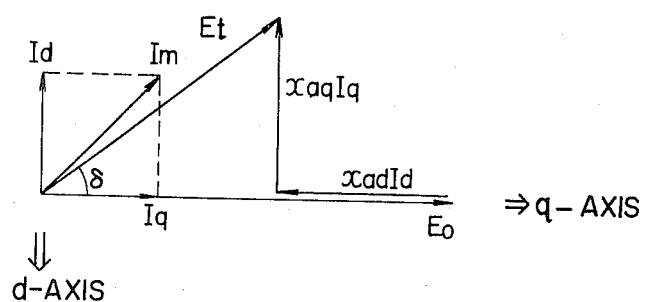
FIG. 6 is a vector diagram to illustrate operation of the control system shown in FIG. 5.

FIG. 6 is a vector diagram to illustrate the principle for determining the terminal voltage at the rated speed. In this figure, symbol $E_o$ represents an induced electromotive force under no-load at the rated speed, the magnitude of which electromotive force is in proportional dependence on the field current rather than the rotational speed of the motor. The symbol $E_t$ represents the terminal voltage at the rated motor speed, $I_m$ represents the armature current, $I_d$ represents a d-axis (direct axis) current component of the current $I_m$, $I_q$ represents a q-axis (quadrate axis) current component of the current $I_m$, $X_{ad}$ and $X_{aq}$ represent, respectively, reactances of the armature reaction along the d-axis and the q-axis at the rated speed, and $\delta$ represents the phase difference between the voltage $E_t$ and $E_o$. The induced electromotive force $E_o$ under no-load is in proportion to the output $I_f$ from the field current command circuit 15. When the d-axis and the q-axis components $I_d$ and $I_q$ of the armature current $I_m$ are thus given, the voltage drops $X_{aq} \cdot I_q$ and $X_{ad} \cdot I_d$ due to the reactance of the armature reaction in the d-axis and the q-axis can be determined. Then, the terminal voltage $E_t$ can be determined on the basis of $E_o$, $X_{aq} \cdot I_q$ and $X_{ad} \cdot I_d$, as can be seen from the vector diagram shown in FIG. 6.

Figure 7:
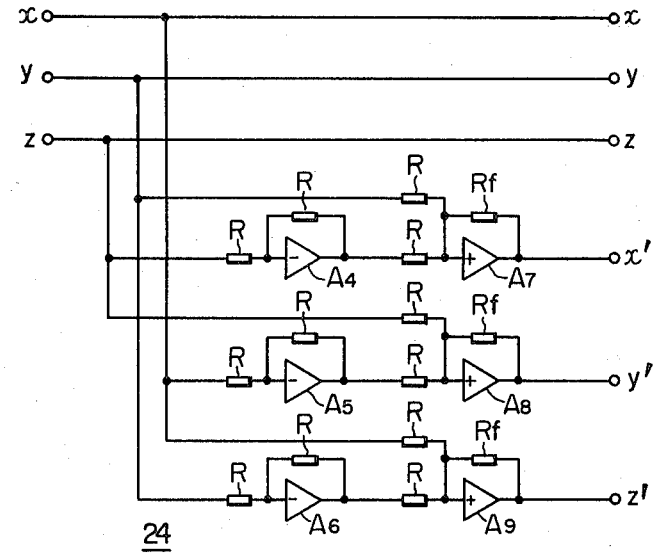
FIG. 7 is a circuit diagram of a phase converter employed in the system shown in FIG. 5.
Figure 8:
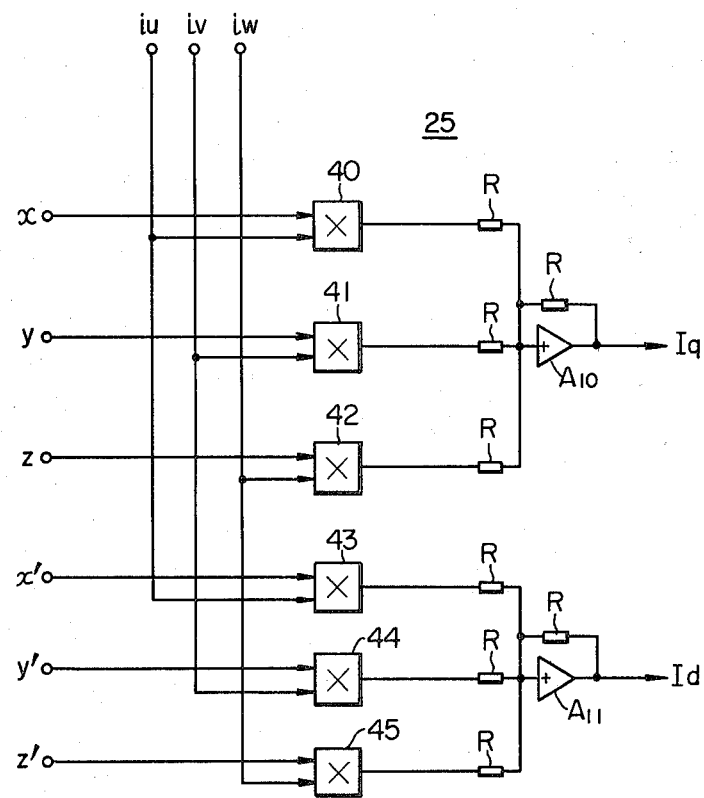
FIG. 8 is a circuit diagram of an operational circuit for arithmetically determining the motor current.

FIGS. 7 and 8 show exemplary circuit arrangements of the phase converter circuit 24 for determining the d-axis component $I_d$ and the q-axis component $I_q$ and the current computation circuit 25.

The phase converter shown in FIG. 7 is composed of inverter amplifiers $A_4$, $A_5$ and $A_6$ for inverting the polarity of the input position signals x, y and z, adder amplifiers $A_7$, $A_8$ and $A_9$ for adding the input signals, and resistors R and $R_f$, the resistance values of which are so selected that $R/R_f = \sqrt{3}$. The phase converter 24 functions to produce the position signals x, y and z and additionally position signals x', y' and z' which are out of phase to the signals x, y and z by 90°, respectively. The position signals x', y' and z' can be determined through the operations of the operational amplifiers $A_4$ to $A_9$ on the basis of the following expressions:

$$x' = \frac{1}{\sqrt{3}} (y - z)$$
$$y' = \frac{1}{\sqrt{3}} (z - x) \quad (3)$$
$$z' = \frac{1}{\sqrt{3}} (x - z)$$

The above expressions may be trigonometrically rewritten as follows:

$$x' = \sin(\omega t - \frac{\pi}{2})$$
$$y' = \sin(\omega t - \frac{7}{6}\pi) \quad (4)$$
$$z' = \sin(\omega t - \frac{11}{6}\pi)$$

From the position signals x, y and z as well as additional position signals x', y' and z' thus obtained, the d-axis component $I_d$ and the q-axis component of the armature current can be determined on the basis of the following formulae:

$$I_d = k(x' \cdot i_U + y' \cdot i_V + z' \cdot i_W) \quad (5)$$

$$i_q = k(x \cdot i_U + y \cdot i_V + z \cdot i_W) \quad (6)$$

where $i_U$, $i_V$ and $i_W$ represent the output current signals from the current detectors 7, 8 and 9, respectively and k represents a constant.

Referring to FIG. 8, the current computation circuit 25 is destined to arithmetically realizing the expressions (5) and (6) and constituted by operational amplifiers $A_{10}$ and $A_{11}$ for producing the product signals from the input signal and a resistor R. Since the operation of this circuit 25 will be self-explanatory, description thereof is omitted. It is however mentioned that the q-axis current component $I_q$ is output from the operational amplifier $A_{10}$, while the d-axis current component $I_d$ is produced from the amplifier $A_{11}$.

Figure 9:
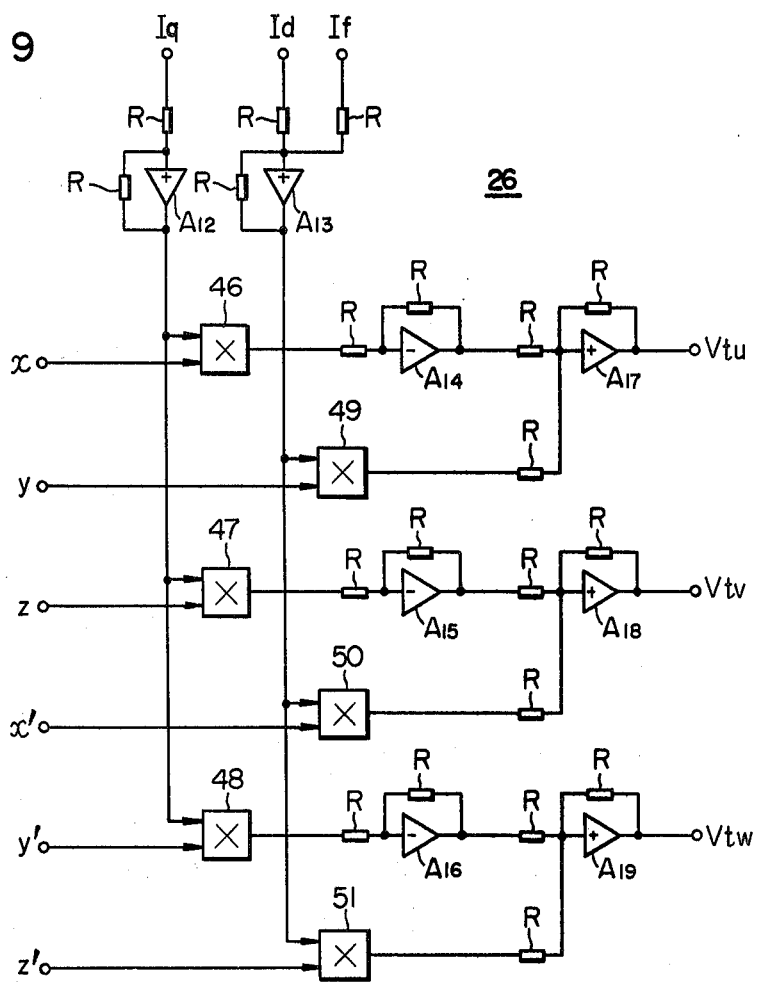
FIG. 9 is a circuit diagram showing an operational circuit for arithmetically determining the motor voltage.

FIG. 9 shows a circuit diagram of the fundamental wave component computation circuit 26, in which A12 and A13 denote operational amplifiers for producing product signals of the respective input signals, 46 to 51 denote multipliers, A14, A15 and A16 designate inverter amplifiers, A17, A18 and A19 denote adder amplifier, and R denotes resistors. The operational amplifier A12 produces an output signal proportional to the d-axis voltage component $I_{aq} \cdot I_q$ (refer to FIG. 6). Since the induced electromotive force $E_o$ under no-load at the rated speed is proportional to the output command signal $I_f$ from the field current command circuit 22, the q-axis voltage component $E_o + X_{ad} \cdot I_d$ can be determined from the output of the addition amplifier A13. When the d-axis and q-axis components of the induced electromotive force $E_o$ and represented by $E_d$ and $E_q$, respectively, then $$E_d = X_{aq} \cdot I_q \quad (7)$$

$$E_q = E_o + X_{ad} \cdot I_d \quad (8)$$

Thus, the fundamental component $E_t$ of the terminal voltage at the rated speed is given by the following expression, as is apparent from the vector diagram shown in FIG. 6. Namely, $$E_t = \sqrt{E_d^2 + E_q^2} \quad (9)$$

Accordingly, the instantaneous value $E_{tU}$ of the U-phase terminal voltage (fundamental wave component) can be determined as follows:

$$E_{tU} = E_t \cdot \sin(\omega t + \delta) \quad (10)$$
$$= E_q \cdot \sin \omega t - E_d \cdot \sin(\omega t - \frac{\pi}{2})$$
$$= E_q x - E_d x'$$

The above expression is arithmetically realized through the multipliers 46; 49 and the operational amplifier A14; A17 thereby to determine the voltage $E_{tU}$ of U-phase (instantaneous value). In a similar manner, V-phase and W-phase voltages $E_{tV}$ and $E_{tW}$ (instantaneous values) at the rated motor speed can be determined through arithmetic operations based on the following expressions:

$$E_{tV} = E_q \cdot y - E_d \cdot y' \quad (11)$$

$$E_{tW} = E_q \cdot z - E_d \cdot z' \quad (12)$$

Thus, from the terminal voltages $E_{tU}$, $E_{tV}$ and $E_{tW}$ in combination with the armature currents $i_U$, $i_V$ and $i_W$ at the rated motor speed, the instantaneous torque value $\tau$ of the synchronous motor can be arithmetically determined on the basis of the following expression:

$$\tau = E_{tU} \cdot i_U + E_{tV} \cdot i_V + E_{tW} \cdot i_W \quad (13)$$

Figure 10:
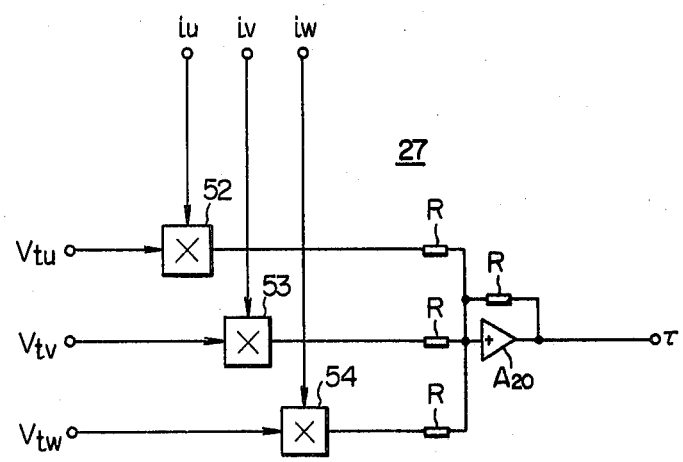
FIG. 10 is a circuit diagram of an operational circuit for arithmetically determining torque as employed in the system shown in FIG. 5.

The above arithmetic operation for determining the instantaneous torque value is effected by the torque computation circuit 27 such as shown in FIG. 10. The products $E_{tU} \cdot i_U$, $E_{tV} \cdot i_V$ and $E_{tW} \cdot i_W$ are produced by multipliers 52, 53 and 54, respectively, the output products from which are input to a summation amplifier A20, the output signal of which then represents the calculated actual torque value containing possibly the torque ripple. The control is so carried out that the actual torque thus obtained follows up the torque command signal $\tau_p$ in the manner described hereinbefore in conjunction with FIG. 1, thereby to cancel out the torque ripple.

In the control system shown in FIG. 5, the terminal voltage is first determined from the field current command signal and the current vector components and then multiplied by the armature current thereby to arithmetically detect the actual torque. With such measures, the torque ripple at a low speed motor operation can be suppressed to a satisfactory degree even if the power factor is not equal to 1 (one).

Figure 11:
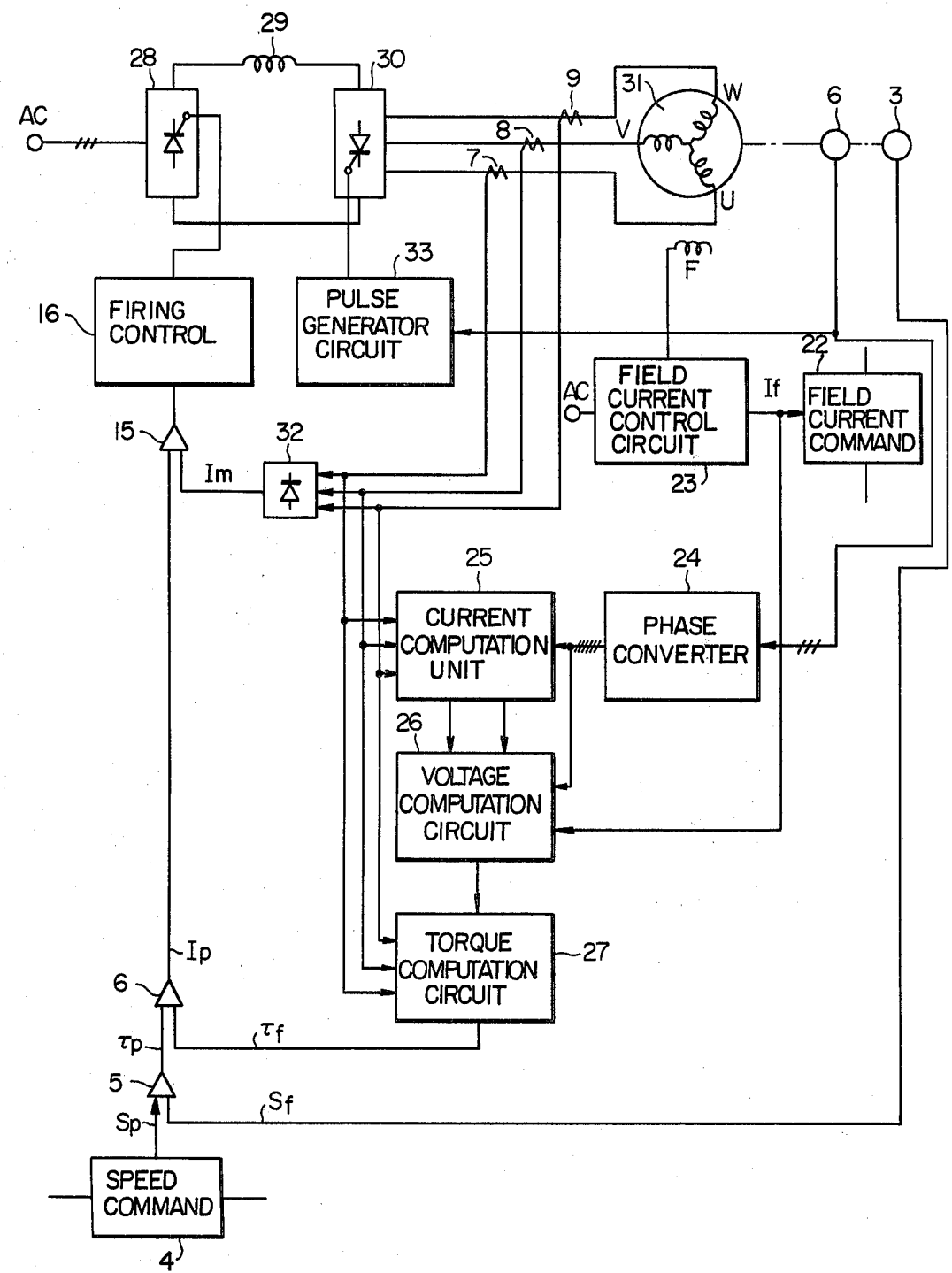
FIG. 11 is a schematic circuit diagram showing a general arrangement of the control system for a synchronous motor according to still another embodiment of the invention.

FIG. 11 shows another embodiment of the invention in which the teachings of the invention is adopted in a commutatorless motor of DC link type. In this figure, the components which correspond to those shown in FIG. 5 are denoted by the same reference numerals with the description thereof being omitted. Referring to FIG. 11, numeral 28 denotes a power rectifier for converting a commercial frequency AC current into DC current, 29 denotes a DC reactor for suppressing the ripple component in the rectified DC current, 30 denotes a power inverter for driving a synchronous motor 31 having armature windings U, V, W and a field winding F, 32 denotes a rectifier circuit for detecting the magnitude of the armature current by rectifying the output from the current detectors 7, 8 and 9, and 33 designates a pulse generator circuit for controlling the firing of thyristors constituting the power inverter in dependence on the position signal obtained from the position detectors.

The operation of the commutatorless motor of DC link type is obvious for those skill in the art. The control system shown in FIG. 11 is also capable of suppressing the torque ripple to a satisfactory degree on the basis of the arithmetically determined actual torque value as is in the case of the embodiment shown in FIG. 5.

As will be appreciated from the foregoing description, the invention teaches that the actual torque value of a synchronous motor is determined on the basis of the armature voltage derived from the position signals and the armature current. Since the amplitude of the position signal remains constant at a low operation speed of the synchronous motor. Therefore, the ratio of voltage components of the terminal voltage which is irrelevant to the production of torque such as the voltage component induced by ripple contained in the rectified output of a frequency converter becomes negligible, whereby the torque ripple is correspondingly reduced. Thus, an effective suppression of the torque ripple can be accomplished even at a low speed range of the synchronous motor.

In the case of the embodiment shown in FIG. 1, it is assumed that the armature reaction is compensated by means of a compensating winding. However, it is to be noted that the invention can be equally applied to the synchronous motor control system in which the armature reaction is compensated by varying the phases of the armature currents in dependence on the magnitude thereof, as disclosed in U.S. Pat. No. 4,060,753. In this case, phase reference signals of the current command signal may be utilized as the position signal applied to the torque computation circuit. The instantaneous torque value can be also determined on the basis of the expression (2) described hereinbefore, since the armature terminal voltage is in phase with the armature current and the phase reference signals because of the motor operation with the power factor being constantly equal to 1.0.

We claim:

1. A control system for suppressing torque ripple of a synchronous motor, comprising:
   (a) the synchronous motor having multi-phase armature windings and a field winding;
   (b) a frequency converter for supplying AC current of variable frequencies to said armature windings;
   (c) a position detector for producing a sinusoidal waveform signal in dependence on the rotational position of said synchronous motor and having a substantially constant amplitude independent of the rotational speed of said motor;
   (d) compensation means for compensating the armature reaction of said synchronous motor;
   (e) current detector means for detecting armature current of said synchronous motor;
   (f) torque computation circuit for arithmetically determining actual torque value from said sinusoidal waveform position signal and said armature current; and
   (g) control means for controlling output current of said frequency converter in response to deviation of said actual torque value from a command torque value for suppressing torque ripple of said synchronous motor even at low motor speeds.

2. A control system for suppressing torque ripple of a synchronous motor, comprising:
   (a) the synchronous motor having multi-phase armature windings and a field winding;
   (b) a frequency converter for supplying AC current of variable frequencies to said armature windings;
   (c) a position detector for producing a sinusoidal waveform signal in dependence on the rotational position of said synchronous motor;
   (d) compensation means for compensating the armature reaction of said synchronous motor;
   (e) current detector means for detecting armature current of said synchronous motor;
   (f) torque computation circuit for arithmetically determining actual torque value from said sinusoidal waveform position signal and said armature current;
   (g) a speed control circuit for comparing an actual speed value with a speed command signal thereby to produce a torque command value;
   (h) a torque control circuit for comparing said torque command value with said actual torque value thereby to produce a torque difference signal;
   (i) a current control circuit for controlling the output current of said frequency converter in dependence on a current command signal obtained by modulating said sinusoidal waveform position signal through said torque difference signal; and
   (j) an amplitude limiter circuit for limiting amplitude of said current command signal.

3. A control system for suppressing torque ripple of a synchronous motor, comprising:
   (a) the synchronous motor having multi-phase armature windings and a field winding;
   (b) a frequency converter for supplying AC current of variable frequencies to said armature windings;
   (c) a position detector for producing a sinusoidal waveform signal in dependence on the rotational position of said synchronous motor;
   (d) compensation means for compensating the armature reaction of said synchronous motor;
   (e) current detector means for detecting armature current of said synchronous motor;
   (f) torque computation circuit for arithmetically determining actual torque value from said sinusoidal waveform position signal and said armature current;
   (g) a speed control circuit for comparing an actual speed value with a speed command signal thereby to produce a torque command value;
   (h) a torque control circuit for comparing said torque command value with said actual torque value thereby to produce a torque difference signal;
   (i) a current control circuit for controlling the output current of said frequency converter in dependence on a current command signal obtained by modulating said sinusoidal waveform position signal through said torque difference signal;
   (j) an amplitude limiter circuit for limiting amplitude of said current command signal; and
   (k) a limit value command circuit for varying the limit value of said amplitude limiter circuit in dependence on rotation speeds of said synchronous motor.

4. A control system for suppressing torque ripple of a synchronous motor, comprising:

(a) the synchronous motor having multi-phase armature windings and a field winding;

(b) a frequency converter for supplying AC current of variable frequencies to said armature windings;

(c) a position detector for producing a sinusoidal waveform signal in dependence on the rotational position of said synchronous motor and having a substantially constant amplitude independent of the speed of said motor;

(d) a voltage computation circuit for arithmetically determining terminal voltage of said synchronous motor at a preset rotation speed on the basis of said sinusoidal position signal;

(e) current detector means for detecting armature current of said synchronous motor;

(f) a torque computation circuit for arithmetically determining an actual torque value on the basis of said terminal voltage from said voltage computation circuit and said armature current; and (g) control means for controlling output current of said frequency converter in response to deviation of said actual torque value from a command torque value for suppressing torque ripple of said synchronous motor even at low motor speeds.

5. A control system for suppressing torque ripple of a synchronous motor, comprising:

(a) the synchronous motor having multi-phase armature windings and a field winding;

(b) a frequency converter for supplying AC current of variable frequencies to said armature windings;

(c) a position detector for producing a sinusoidal waveform signal in dependence on the rotational position of said synchronous motor;

(d) a voltage computation circuit for arithmetically determining terminal voltage of said synchronous motor at a preset rotation speed on the basis of said sinusoidal position signal;

(e) current detector means for detecting armature current of said synchronous motor;

(f) a torque computation circuit for arithmetically determining an actual torque value on the basis of said terminal voltage from said voltage computation circuit and said armature current;

(g) control means for controlling output current of said frequency converter in response to deviation of said actual torque value from a command torque value; and (h) a field current control circuit for controlling the field current of said synchronous motor.

6. A control system for suppressing torque ripple of a synchronous motor, comprising:

(a) the synchronous motor having multi-phase armature windings and a field winding;

(b) a controllable rectifier device for converting AC current into DC current;

(c) a power inverter for converting the DC output of said controllable rectifier device into AC current to be supplied to said armature windings;

(d) a position detector for producing a sinusoidal waveform signal in dependence on the rotational position of said synchronous motor and having a substantially constant amplitude independent of the speed of said motor;

(e) a voltage computation circuit for arithmetically determining terminal voltage of said synchronous motor at a preset rotation speed on the basis of said sinusoidal position signal;

(f) current detector means for detecting armature current of said synchronous motor;

(g) a torque computation circuit for arithmetically determining an actual torque value on the basis of said terminal voltage from said voltage computation circuit and said armature current; and (h) control means for controlling output current of said frequency converter in response to deviation of said actual torque value from a command torque value for suppressing torque ripple of said synchronous motor even at low motor speeds.

* * * * *